US009794095B2

(12) United States Patent
Sornin et al.

(10) Patent No.: US 9,794,095 B2
(45) Date of Patent: Oct. 17, 2017

(54) SIGNAL CONCENTRATOR DEVICE

(71) Applicant: Semtech Corporation, Camarillo, CA (US)

(72) Inventors: Nicolas Sornin, La Tronche (FR); Ludovic Champion, Grenoble (FR)

(73) Assignee: Semtech Corporation, Camarillo, CA (US)

( * ) Notice: Subject to any disclaimer, the term of this patent is extended or adjusted under 35 U.S.C. 154(b) by 0 days.

(21) Appl. No.: 14/755,602

(22) Filed: Jun. 30, 2015

(65) Prior Publication Data
US 2016/0020932 A1 Jan. 21, 2016

(30) Foreign Application Priority Data

Jul. 18, 2014 (EP) ..................................... 14177644

(51) Int. Cl.
| H04B 1/00 | (2006.01) |
| H04L 27/10 | (2006.01) |
| H04W 88/16 | (2009.01) |
| H04L 27/14 | (2006.01) |
| H04B 1/69 | (2011.01) |

(52) U.S. Cl.
CPC ............. *H04L 27/103* (2013.01); *H04B 1/69* (2013.01); *H04W 88/16* (2013.01); *H04B 2001/6912* (2013.01); *H04L 27/14* (2013.01)

(58) Field of Classification Search
CPC   H04B 1/69; H04B 1/7163; H04B 2001/6912; H04L 27/2601; H04L 27/22; H04L 27/103; H04L 27/14; H04L 27/2602; H04W 88/16

USPC .......................... 375/260, 295, 139, 146, 242
See application file for complete search history.

(56) References Cited

U.S. PATENT DOCUMENTS

| 6,549,562 | B1 | 4/2003 | Olaker et al. |
| 6,614,853 | B1 | 9/2003 | Koslar et al. |
| 6,940,893 | B1 | 9/2005 | Pinkney et al. |
| 7,974,246 | B1* | 7/2011 | Fulthorp ............... H04W 74/02 370/337 |
| 2001/0004604 | A1* | 6/2001 | Toshimitsu ............ H01Q 1/246 455/562.1 |
| 2004/0090353 | A1* | 5/2004 | Moore ................. H04B 1/7163 341/53 |
| 2004/0141548 | A1* | 7/2004 | Shattil ...................... H04L 1/04 375/146 |

(Continued)

FOREIGN PATENT DOCUMENTS

| EP | 0952713 | 10/1999 |
| EP | 2449690 | 5/2012 |
| EP | 2763321 | 8/2014 |

*Primary Examiner* — Leila Malek
(74) *Attorney, Agent, or Firm* — Blank Rome LLP

(57) ABSTRACT

A gateway device having a baseband processor for processing a plurality signals carrying a digital information modulated in the form of chirp signal, the chirp signals being either base chirps, for which the frequency changes from an initial instant to a final instant according to a predetermined base chirp function, or modulated chirps, whose instantaneous frequencies vary according to one of a plurality of a functions that differ from said base chirp function, characterized in that the gateway device is arranged for simultaneously demodulating a plurality of signals having received at a same frequency and exhibiting different bitrates.

13 Claims, 3 Drawing Sheets

(56) References Cited

U.S. PATENT DOCUMENTS

| | | | | |
|---|---|---|---|---|
| 2005/0003824 | A1* | 1/2005 | Siris | H04L 47/10 |
| | | | | 455/452.1 |
| 2011/0064119 | A1* | 3/2011 | Sforza | H04B 1/69 |
| | | | | 375/139 |
| 2013/0025374 | A1* | 1/2013 | Voskoboinik | G01D 5/35303 |
| | | | | 73/655 |
| 2013/0051432 | A1* | 2/2013 | Hiscock | H04B 1/69 |
| | | | | 375/139 |
| 2014/0369388 | A1* | 12/2014 | Parks | H04B 13/00 |
| | | | | 375/139 |

* cited by examiner

SIGNAL CONCENTRATOR DEVICE

REFERENCE DATA

The present application claims priority from European patent application EP14177644.3 of Jul. 18, 2014 in the name of the applicant, the contents whereof are hereby incorporated in their entirety.

FIELD OF THE INVENTION

The present invention concerns, in embodiments, a receiver and transmitter system for a wireless data network and in particular, but not exclusively, a gateway system capable of dealing with a plurality of messages encoded as modulated radio chirps.

DESCRIPTION OF RELATED ART

Digital wireless data transmission is used in a wide variety of systems that present a great variability in both in data rate, transmission range, and power consumption. There is however a need of a digital transmission scheme that allies a long transmission range with low power consumption, and can be realized with simple receivers and transmitters.

Spread-spectrum modulation techniques are used to improve the immunity to noise and interferences in radio communication, the various Bluetooth® protocols are examples of such techniques. These modulation schemes use frequency-hopping spread-spectrum and achieve low consumption and good bandwidth, but their range is limited to a few meters.

Direct-sequence spread-spectrum techniques are also known and can reach very high levels of coding gain. In some cases, like in GPS system, have shown excellent noise immunity over long ranges. Limitation of these techniques are however the comparatively high complexity of the receivers, the acquisition times that can be very long for weak signals, and their power consumption.

European patent application EP2449690 describes a communication system using digitally-synthesized chirp symbols as modulation, and a suitable FFT based receiver.

Chirp generation in various kind of radiofrequency circuits is known, for example U.S. Pat. No. 6,549,562 describes a method for generating modulated chirp signal, while EP0952713 shows a synchronisation process based on chirp signals.

U.S. Pat. No. 6,940,893 and U.S. Pat. No. 6,614,853, among others, describe generation and use of chirp signal by passing an impulsive signal through a dispersive filter, and communication schemes based thereupon.

Chirp modulation systems like or similar to those disclosed by EP2449690 lend themselves to the realization of low-power long-distance transmitters, and can be used to realize distributed multi-node networks comprising a plurality of nodes spread across a large area, in communication with a gateway system. It is often the case that the individual nodes are simple sensors with an autonomous power source, for example in the nature of a battery or a solar panel unit, which communicate relatively infrequently with the gateway, in order to preserve their energy resources.

Distributed network of this kind can be used for example in Many applications including, but not limited to, asset tracking, surveillance, energy metering, surveillance, environmental measurements, and in many other applications. Since in these applications the end nodes or sensor rely on an autonomous and limited energy supply, low consumption is of paramount importance.

The volume of traffic at the gateway, however, increase together with the number of nodes and it is important that the gateway be able to receive and decode a number as high as possible of communications, avoiding as far as possible errors and retransmissions that would slow the system and increase the power consumption at the end nodes.

There is therefore a need for a gateway system that is able to deal with a large number of simultaneous communications in an efficient manner.

BRIEF SUMMARY OF THE INVENTION

According to the invention, these aims are achieved by means of the object of the appended claims.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Central to the present invention is a digital modulation technique that is based on the emission and reception of frequency chirps and is commercially known as 'LoRa'. This document will therefore use the name 'LoRa' to indicate this modulation technique in general and for the easy of reading, although it must be understood that the invention is not limited to a specific standardised modulation scheme, but is applicable to all modulation techniques as indicated in the claims.

Figure 1:
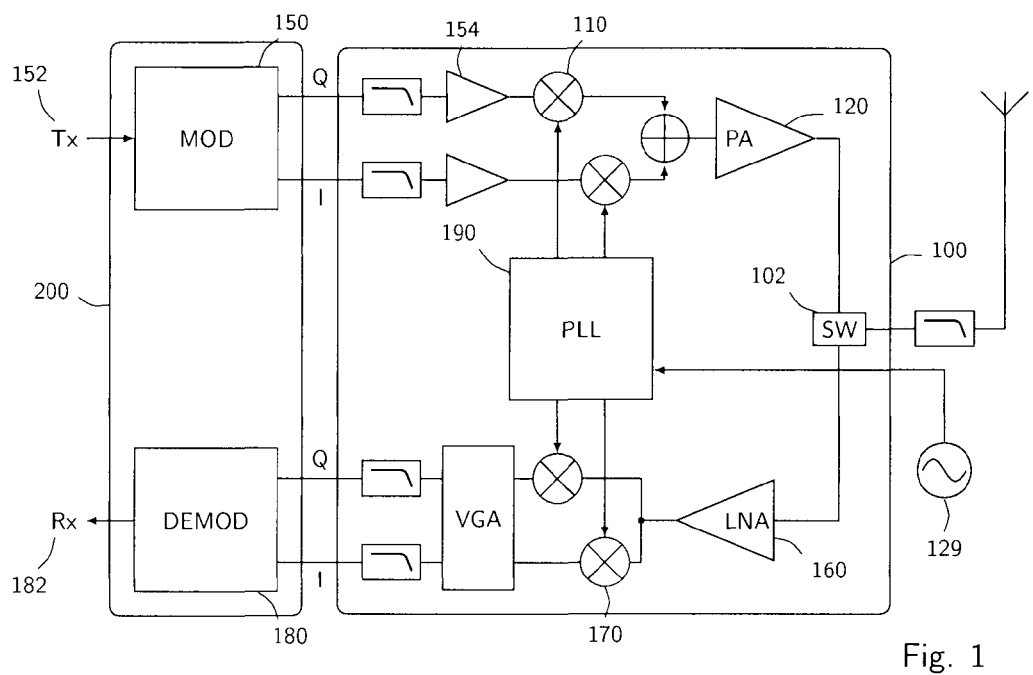
FIG. 1 shows, in schematic simplified fashion, the structure of a radio modem according to one aspect of the present invention.

Several aspects of the chirp modulation technique employed in the present invention are described in European Patent Application EP2763321 that is hereby incorporated by reference, and will be reminded here summarily. FIG. 1 represents, in schematized simplified fashion a conceptual one-channel radio transceiver that can operate the chirp modulation that is used in the invention. Even if the invention primarily deals with the transmission and reception of multiple simultaneous data packets, the circuit of FIG. 1 will now be described as a non-limiting example of the LoRa modulation.

The transceiver of FIG. 1 includes a baseband section 200 and a radiofrequency section 100. Concentrating on the transmitter part, the baseband modulator 150 generates, based on the digital data 152 that are present at its input, a baseband signal whose I and Q component are converted to the desired transmission frequency by the RF section 100 amplified by the power amplifier 120, and transmitted by the antenna, selected by the RF switch 120. The architecture presented allows several variants and modifications, without departing from the frame of the invention, and is provided as non-limiting example.

The conversion of the signal from the baseband to the intended frequency is done, in this example, by mixing in mixer 110 the signal provided by amplifiers 154 with the in-phase and quadrature components of a local carrier generated by circuit 190, and linked to a reference clock 129.

Once the signal is received on the other end of the radio link, it is processed by the receiving part of the transceiver of FIG. 1 comprising a low noise amplifier 160 followed to a down-conversion stage that generates a baseband signal comprising a series of chirps that is then processed by the baseband demodulator 180, whose function is the reverse of that of the modulator 150, and provides a reconstructed digital signal 182.

As discussed in EP2763321, the modulator 150 synthesizes a baseband signal that comprises a series of chirps whose frequency changes, along a predetermined time interval, from an initial instantaneous value $f_0$ to a final instantaneous frequency $f_1$. It will be assumed, to simplify the description, that all the chirps have the same duration T, although this is not an absolute requirement for the invention.

The chirps in the baseband signal can be described by the time profile $f(t)$ of their instantaneous frequency or also by the function $\phi(t)$ defining the phase of the signal as a function of the time. Importantly, the modulator 150 can generate chirps having a plurality of different profiles, each corresponding to a symbol in a predetermined modulation alphabet.

Figure 2A:
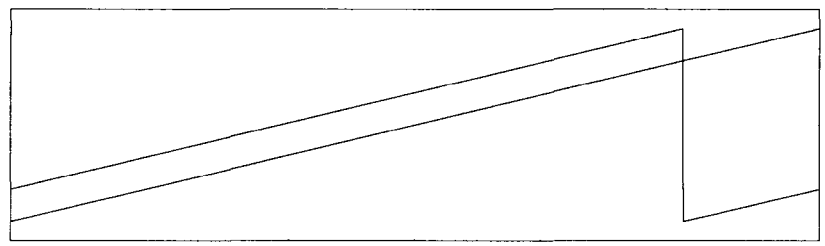
FIG. 2a plots the instantaneous frequency of a base chirp and of a modulated chirp according to one aspect of the invention. The phase of the same signals are represented in FIG. 2b, and FIG. 2c plots the real and of the complex component of the base chirp, in the time domain.
Figure 2B:
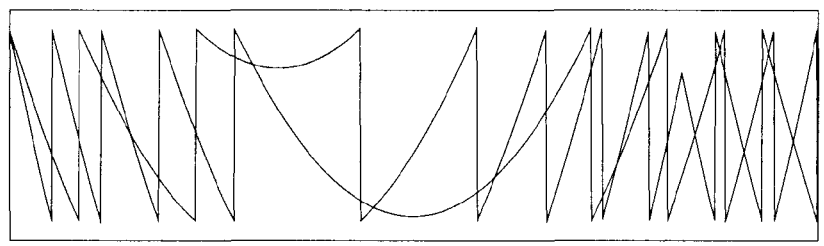
Figure 2C:
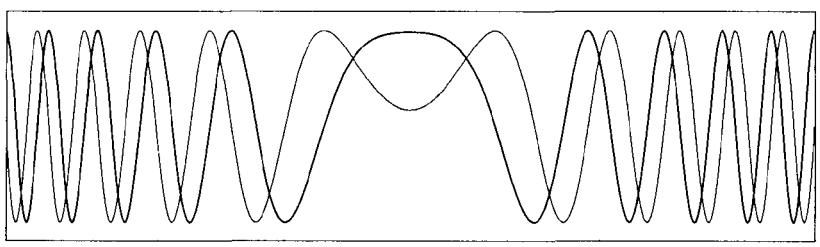

According to an important feature of the invention, the modulator 150 can generate either base chirp (also called unmodulated chirps in the following) that have specific and predefined frequency profile, or one out of a set of possible modulated chirps, obtained from base chirps by time-shifting cyclically the base frequency profile. FIG. 2a illustrates, by way of example, possible frequency and phase profiles of a base chirp and of one modulated chirps between the time instant $t=t_0$ at the beginning of a chirp and the instant $t=t_1$ at the end of the chirp, while FIG. 2b shows the corresponding baseband signals in the domain of time.

In the example depicted, the frequency of a base chirps increases linearly from an initial value $f_0=-BW/2$, to a final value $f_1=BW/2$, where BW stands for the amount of bandwidth spreading, but descending chirps or other chip profiles are also possible. Thus, the information is encoded in the form of chirps that have one out of a plurality of possible cyclic shifts with respect to a predetermined base chirp, each cyclic shift corresponding to a possible modulation symbol.

Preferably, the modulator is also arranged to synthesize and insert in the signal conjugate chirps that is chirps that are complex-conjugate of the base unmodulated chirp. One can regard these as down-chirps, in which the frequency falls from a value of $f_0=+BW/2$ to $f_1=-BW/2$.

More preferably, the phase of the chirps is described by a continuous function $\phi(t)$ that has the same value at the beginning and at the end of a chirp: $\phi(t_0)=\phi(t_1)$. Thanks to this, the phase of the signal is continuous across symbol boundaries, a feature that will be referred to in the following as inter-symbol phase continuity. In the example shown in FIG. 2a, the function $f(t)$ is symmetrical, and the signal has inter-symbol phase continuity. As is explained in more detail by EP2763321, the structure of the signal described above allows the demodulator unit 180 in the receiver to align its time references with that of the transmitter, and the determination of the amount of cyclical shift imparted to each chirp by multiplying for a complex conjugate of the base chirp, and performing a FFT. The position of the maximum of the FFT is indicative of the shift, and of the modulation value. Thus, "cyclic shift value" may be used in the following to indicate the modulation in the time domain, and "modulation position", or "peak position" represents it in the frequency domain.

The length N of the symbol, which is directly related to the spreading factor, can be fixed in the modulation/demodulation protocol. As to the bandwidth, the LoRa standard accommodates multiple bandwidths of chirps, selectable according to the application and circumstances, for example 125, 250, and 500 KHz, the invention is not limited to a particular bandwidth or set of bandwidths, however.

Importantly, signal transmitted at different bit rates, for example because they are characterized by different spreading factors or by different chirp lengths, are orthogonal, in the sense that they can be transmitted and received simultaneously without interference on the same data channel; to a LoRa demodulator adapted to receive and decode signal having a stated bit rate, signals having a different bit rate appear as noise. Thus, the chirp modulation system presented above offer on one single frequency a plurality of independent channels having different bit rate.

The orthogonality property mentioned above should not be construed as implying that all combination of spreading factor and bandwidth are orthogonal and, in fact, some non-diagonal combination of spreading factor and bandwidth in the LoRa modulation are not orthogonal, as illustrated in Table 1. Provided non-orthogonal combinations are avoided, however, messages having different spreading factors and/or bandwidths can be received independently from one another.

TABLE 1 non-orthogonal ('X') combinations of LoRa channels characterized by spreading factor (SF) and bandwidth (BW) in kHz

| SF | BW | 07 125 | 08 125 | 09 125 | 10 125 | 11 125 | 12 125 | 07 250 | 08 250 | 09 250 | 10 250 | 11 250 | 12 250 | 07 500 | 08 500 | 09 500 | 10 500 | 11 500 | 12 500 |
|---|---|---|---|---|---|---|---|---|---|---|---|---|---|---|---|---|---|---|---|
| 07 | 125 | x | | | | | | x | | | | | | | | | | x | |
| 08 | 125 | | x | | | | | | x | | | | | | | | | | x |
| 09 | 125 | | | x | | | | | | x | | | | | | | | | |
| 10 | 125 | | | | x | | | | | | x | | | | | | | | |
| 11 | 125 | | | | | x | | | | | | | | | | | | | |
| 12 | 125 | | | | | | x | | | | | | | | | | | | |
| 07 | 250 | | | | | | | | | | | | | | | x | | | |
| 08 | 250 | | | | | | | | x | | | | | | | | x | | |

TABLE 1-continued non-orthogonal ('X') combinations of LoRa channels characterized by spreading factor (SF) and bandwidth (BW) in kHz

| SF | BW | 07 125 | 08 125 | 09 125 | 10 125 | 11 125 | 12 125 | 07 250 | 08 250 | 09 250 | 10 250 | 11 250 | 12 250 | 07 500 | 08 500 | 09 500 | 10 500 | 11 500 | 12 500 |
|---|---|---|---|---|---|---|---|---|---|---|---|---|---|---|---|---|---|---|---|
| 09 | 250 | x | | | | | | | | x | | | | | | | | x | |
| 10 | 250 | | x | | | | | | | | x | | | | | | | | x |
| 11 | 250 | | | x | | | | | | | | x | | | | | | | |
| 12 | 250 | | | | x | | | | | | | | x | | | | | | |
| 07 | 500 | | | | | | | | | | | | | x | | | | | |
| 08 | 500 | | | | | | | | | | | | | | x | | | | |
| 09 | 500 | | | | | | x | | | | | | | | | x | | | |
| 10 | 500 | | | | | | | | x | | | | | | | | x | | |
| 11 | 500 | x | | | | | | | | x | | | | | | | | x | |
| 12 | 500 | | x | | | | | | | | x | | | | | | | | x |

When the chirp modulation is used in a distributed network comprising a plurality of nodes spread across a large area, the orthogonality property discussed above enable multiple concurrent transmission and is especially advantageous. Even more advantageously, the transmissions between the distributed nodes and gateway can preferably use chirps having different frequencies, for example centred about one of a plurality of possible sub-carriers.

LoRa signals having different chirp bandwidth are also orthogonal, and can be received and transmitted at the same time, even if their frequency spectra overlap: a LoRa receiver adapted to receive signals having a determined bandwidth will only decode signals modulated with that, and other LoRa signals having different bandwidths, will appear to it as noise, even if their frequency spectrum overlaps that of the received signals.

Figure 3:
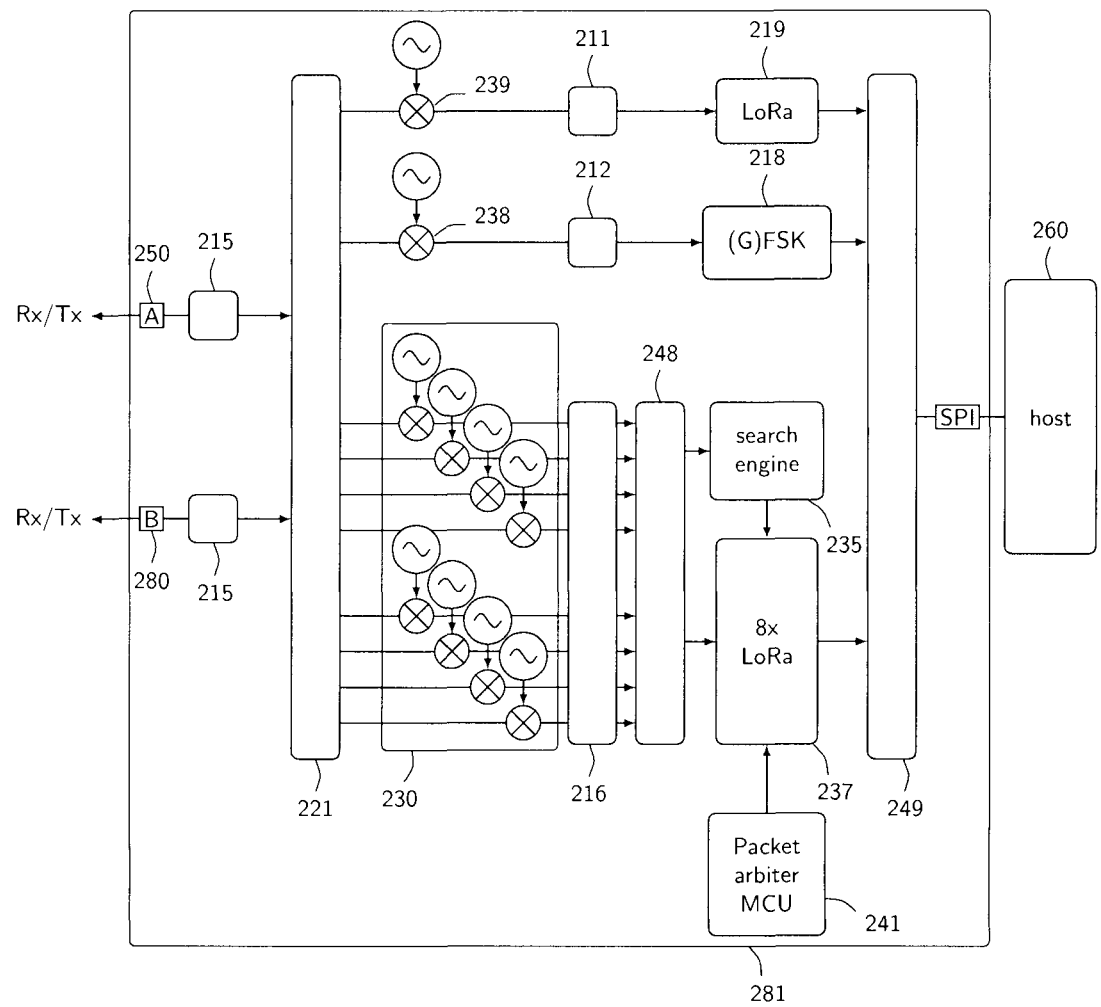
FIG. 3 shows, schematically a structure of a gateway system according to one aspect of the present invention.

FIG. 3 shows schematically a possible structure of a baseband processor 281 in a gateway according to the present invention. The role of this gateway is to serve as hub of an asynchronous star network of $>10^4$ wireless nodes, each node uses a random channel and a different data rate for each transmission, according to the transmission conditions.

Typically nodes located near the gateway will use the highest possible data rate in a predetermined bandwidth compatibly with a stated chirp-based modulation system. To provide a non-limiting concrete example, the chirp bandwidth can be fixed at 125 kHz bandwidth, and the data rates can range, in predetermined discrete steps, from 6 kbit/s to a minimum of 300 bits/s. Preferably, the individual nodes are arranged to choose autonomously an adapted data rate based on the perceived signal quality, channel condition, range to the hub, or any suitable parameter, the adapted data rate being for example, the fastest rate that allows reliable communication given the instantaneous signal quality.

The baseband processor 281 is preferably implemented in a single chip, preferably combinable with other chips of the same type or of compatible type to increase the capacity. The baseband processor 281 includes a packet arbiter microcontroller 281 that assigns available demodulation resources to the various reception path. Since the demodulators 237 are limited in number, and the detected packet can exceed the number of demodulators, the arbiter is preferably arranged for assigning the available demodulators according to suitable priority rules that may include giving priority to:
  predetermined spreading factor and/or bandwidth;
  higher signal/noise ratio in the channel;
  new signals in a previously unoccupied channel, defined for example by a combination of frequency, bandwidth, and spreading factor;

the list is not exhaustive. The invention is not limited to a rule-driven arbitration algorithm, either, and the packet arbiter could also have a non-deterministic behaviour, for example.

The packet arbiter MCU 281 is preferably realized by a dedicated processor, but it could also, in the frame of the invention, be a general-purpose controller that attends also to other functions. Also, the packet arbiter could be embodied by a collection of cooperating hardware and software resources of the baseband processor 281 not organized as a is also microcontrollers or MCU, but the invention could be realized also by a chip having one single microcontroller unit attending to the necessary function, or any number of microcontroller units. The microcontroller or microcontrollers are capable of communicating with an external host system 260 by means of a suitable data connection, for example a SPI bus.

Preferably, although not represented in FIG. 3, the baseband processor 281 is also arranged for sending commands to the radio units connected to inputs 'A' and 'B', for example for tuning their respective frequency bands and setting their amplification gain, thereby implementing an AGC function. This function could be implemented by additional dedicated SPI connections and a specialized controller in the baseband processor 281.

In the presented example, the processor 281 comprises a plurality of configurable reception paths 231, 238, 239 with different levels of programmability and use cases. Preferably, the reception path receive one or several streams of digital I&Q baseband or low-IF signals from a suitable number of radio receiver units. In FIG. 3, the baseband processor is arranged to be coupled to two radio units, and two input terminals for such baseband or low-IF signals are indicated with A and B. It must be understood, however, that the invention is not limited to a determined number of inputs.

Figure 4A:
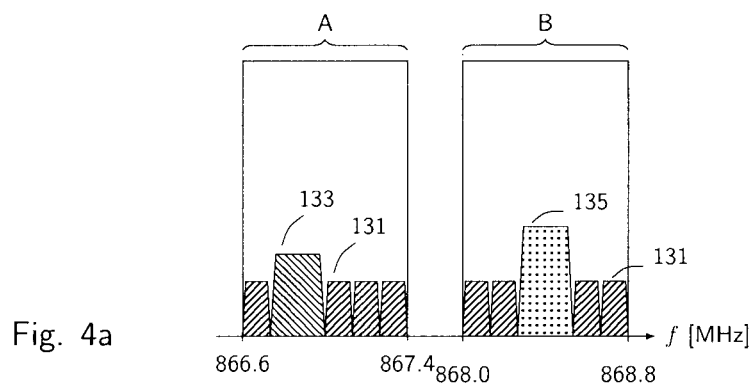
FIGS. 4a and 4b illustrate two possible channel arrangements in a wireless network according to one aspect of the invention.
Figure 4B:
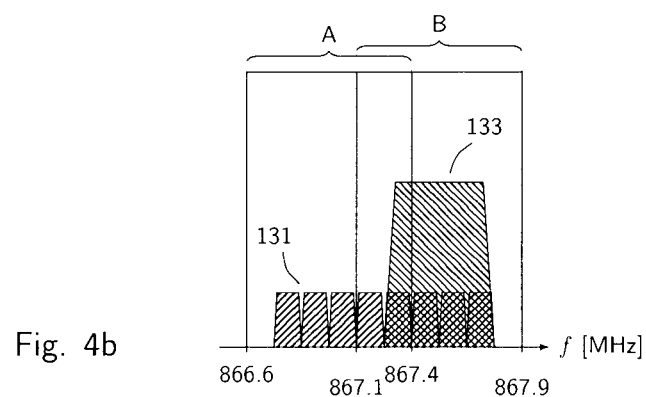

The radio receivers connected to the A and B units can be arranged to receive signals in a suitable portion of the radio spectrum. FIGS. 4a and 4b show two possible arrangements that can be obtained by using two radio receiver units.

In FIG. 4a, the radio units A and B are tuned in order to cover two adjacent non overlapping intervals in the 863-870 MHz SRD bands, for example 866.6-867.5 MHz for radio 'A' and 868.0-868.8 MHz for radio 'B'. In these intervals, the radio units are arranged to receive eight multi-bitrate LoRa channels 138 located in separate frequency sub-bands with a bandwidth of 125 kHz; one 250 kHz-wide single-bitrate LoRa channel 133 and one legacy 250 kHz-wide FSK channel 135. Channels 133 and 135 are used as backhaul to transmit data between gateway stations in a network, while multi-bitrate LoRa channels 131 serve to the communication between the gateway and the end nodes. Importantly, the eight multi-bitrate channels 138 can support more than eight communications at the same time, due to the orthogonality of the different bitrates.

FIG. 4b shows how the radios 'A' and 'B' can be tuned on partially overlapping intervals in order to cover a continuous interval of radio spectrum, which comprises eight multi-bitrate LoRa channels 138 having a bandwidth of 125 kHz each and one fixed-bitrate LoRa backhaul channel having a bandwidth of 500 kHz. Due to the orthogonality property mentioned above, the backhaul channel 133 and the node channels 131 can overlap.

It is clear that the two examples presented are not to be construed as limitations of the invention that could also admit embodiments with a different number of radios, alternative frequency distributions, in other parts of the radio spectrum as well. The radio units are preferably arranged not only to receive, but also to transmit modulated data in the aforementioned LoRa and FSK channels, although this function could conceivably be implemented by separate hardware resources without leaving the scope of the invention.

Accordingly, the gateway device of the invention could include one or more modulation units, for encoding a digital message into a modulated signal in the baseband in which the information is encoded as transmitted chirp signals. The transmission could be possible on several channels and towards a plurality of targets at the same time, similarly to what will be described below with respect to the reception, or one packet at a time.

Figure 5:
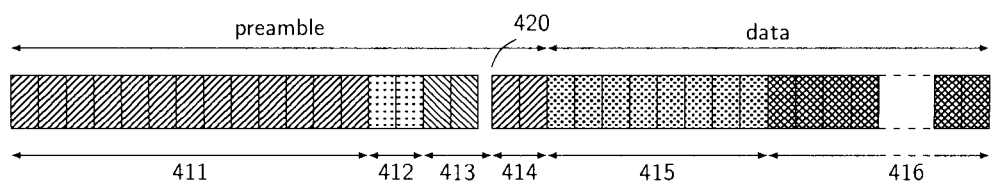
FIG. 5 illustrates a possible data structure for the invention.

According to another aspect of the invention, the transmitted signals is organised in frames that include a preamble and a data section. FIG. 5 illustrates a possible frame structure for the invention. It must be understood, however that this frame structure is provided as an example, the invention allows embodiment that deviate from this special structure, without departing from the scope of the invention defined by the claims.

Each rectangle in FIG. 5 represents a chirp symbol in a time series that runs, conventionally, from left to right. The preamble begins with a detect sequence 411 of base (i.e. un-modulated, or with cyclic shift equal to zero) symbols. The detect sequence 411 is used in the receiver to detect the beginning of the signal and, preferably, perform a first synchronisation of its time reference with the time reference in the transmitter. By multiplying the demodulated detect sequence by a locally-synthesized conjugate chirp, and performing a FFT operation, the receiver is able to determine a shift amount.

The length of the detect sequence can be arbitrarily long. This is used in application in which communications are sparse and separated by long intervals of inactivity during which the receivers are in low-power standby modes. The receiver exhibits in general an idle time, upon reception of a first signal, for commuting from the standby state into a fully awake state. The preamble is preferably chosen longer than the idle time of receivers, which ensures a high probability of preamble detection.

The end of the detect sequence is marked by one or more, preferably two, frame synchronisation symbols 412. According to another aspect of the invention, the preamble includes preferably frequency synchronisation symbols 413 that consist in one or more, preferably two chirps that are complex-conjugate of the base unmodulated chirp. Optionally, the header further includes fine synchronisation symbols 414 that are unmodulated base chirps, for example.

More information on the synchronisation can be found in European application EP2763321.

The payload 416 is preferably preceded by a header 415 that describes how to decode the information bits, together with all sort of data useful to decode the payload.

Reverting now to FIG. 3, the digital I&Q samples present at input terminals 'A' and 'B' are pre-processed by two decimation units 215 and copied in an input sample bus or buffer 221, whence they are available to a plurality of converters and demodulators The frequency converter 239 can be connected to any of the radio inputs A or B using any arbitrary IF in the allowed range, and its output is connected to a decimation unit d and to a LoRa demodulator 219; the demodulation bandwidth is programmable, that is this channel can be adapted to demodulate chirp-based signals having a variety of possible bandwidth, for example 125, 250, or 500 kHz, and the data rate can be configured to any available data rates of the used modulation standard, but this channel will be capable receiving and demodulating only the configured data rate, and will ignore any signal modulated according to another data rate. This demodulation chain correspond to the radio channels 133 presented in FIGS. 4a and 4b, and is intended to serve as high-speed backhaul to other gateways or equipment.

Another reception channel comprising frequency converter 238, decimation unit 212 and (G)FSK demodulator 218 is functionally similar to the previous one, except that it is arranged to demodulate legacy FSK or GFSK formatted signals. The demodulator is configurable in bandwidth, bitrate, and other parameters. This correspond to the legacy backhaul channel 155 of FIG. 4a.

A bank 230 comprises a plurality of frequency converters individually connectable to radio A or B. The channel bandwidth of each of those is fixed, for example 125 kHz and each channel IF can be configured individually, such that each channel is capable of receiving chirp-modulated signal on a predetermined frequency sub-channel. These converters are tuned to receive the node LoRa channels 131 presented in FIGS. 4a and 4b, for example.

Preferably each of the IF0-IF7 channels is capable of receiving any allowable data rate without prior configuration. Several packets using different data rates can be demodulated simultaneously even on the same channel, thanks to the orthogonality of different data rates in the chirp modulation of the invention.

The baseband-converted samples generated by the converters 230 are processed by a decimation unit 216 routed by a switch fabric unit 248 to a plurality of fixed-bandwidth LoRa demodulators 237 under control of the packet arbiter MCU 241. The preamble search engine 235 scans the signals generated form the 230 converters for preambles of all data rates at all time. As discussed above, the preamble can be a series of unmodulated base chirps and, in this case, the preamble search engine is operatively arranged to detect series of unmodulated base chirps for all possible data rates at the same time and, once a preamble is detected, cause the data packet, including the preamble and the subsequent payload to be demodulated in one of the units comprised in the multiple LoRa demodulator 237.

Since the chip preamble detection is separated by demodulation, the system can detect all preambles at all data rates on each of the channel but it is capable of demodulating up to N packets simultaneously, where N is ne number of independent demodulators. In a preferred realization, the demodulator unit 237 comprises eight independent demodulators, but this number is not an essential limitation of the invention.

The multi-data rate multi-channel demodulation allows innovative network architectures: end-points can change frequency with each transmission, according to any pattern, or else at random. This improves the system robustness to interferers. Since detection is guaranteed no matter what the frequency and the data rate, the receiver needs not know the transmission frequencies in advance and these can be entirely non-predictable and non-deterministic.

End-points can dynamically adapt the data rate according to their link margin, without adding to the protocol complexity. In effect the receiver need not know beforehand the data rate of any received packet. There is no need to maintain a table of link rates per each end point, since all the rates are demodulated in parallel.

The gateway can employ antenna diversity to improve performance.

Received packets are tagged with additional information and stored in a FIFO structure 249 that is implemented, for example, by a shared memory area and a table of start, end pairs, or in any other suitable manner. The packet can be transferred to the host micro-controller via the SPI interface. Additional information added to received packets can include, for example, the demodulation channel number, SNR avf/min/max, RSSI, a timestamp, or any other information.

REFERENCE NUMBERS

100 Radiofrequency section
102 switch
110 mixer
120 power amplifier
129 reference clock
131 multi-bitrate LoRa channel
133 single-bitrate LoRa channel
135 FSK channel
150 modulator
152 digital TX data
154 amplifier
160 Low Noise amplifier
170 down-conversion stage
180 baseband demodulator
182 digital Rx data
190 PLL
200 baseband section
211 decimation unit
212 decimation unit
215 decimation unit
216 decimation unit
218 (Gaussian) Frequency Shift Keyed demodulator
219 LoRa demodulator
221 sample bus/sample buffer
230 converter bank
235 preamble search engine
237 LoRa demodulators
238 frequency converter
239 frequency converter
241 packet Arbiter MCU
248 switch fabric
249 FIFO
250 input radio unit 'A'
260 host
280 input radio unit 'B'
281 baseband processor
411 detect sequence
412 frame synchronisation symbols
413 frequency synchronisation symbols
414 fine synchronisation symbols
415 header
416 payload
420 silence

The invention claimed is:

1. A gateway device having a processor for processing a plurality of signals carrying a digital information modulated in the form of chirp signals, the chirp signals being either base chirps, for which the frequency changes from an initial instant to a final instant according to a predetermined base chirp function or modulated chirps, whose instantaneous frequencies vary according to one of a plurality of a functions that differ from said base chirp function, each base chirp and each modulated chirp corresponding to a symbol of a modulation alphabet, the gateway device further comprising one demodulator or several demodulators, arranged for reconstructing the digital information based on said symbols, and for simultaneously demodulating a plurality of signals, whose frequencies overlap, and having different bitrates, and different spreading factors or chirp lengths, wherein the different spreading factors or chirp lengths provide for orthogonality between the plurality of signals.

2. The gateway device of claim 1, wherein each chirp signal being limited in time between an initial instant, at which the chirp signal has an initial instantaneous frequency and an initial phase; and a final instant at which the chirp signal has a final instantaneous frequency and a final phase, the phase of the chirp signal being essentially continuous.

3. The gateway device of claim 1, wherein the instantaneous frequency of the modulated chirps varies according to a function that is a cyclical shift of the base chirp function.

4. The gateway device of claim 1, further comprising a plurality of frequency converters tuned to detect signals in a plurality of frequency sub-bands.

5. The gateway device of claim 1, wherein said chirp signals include preamble parts, and the gateway device further comprises a preamble search engine and a plurality of demodulators, the preamble search engine being operatively arranged to scan the signals generated from a plurality of frequency converters, identify said preamble parts for all data rates and, when a preamble is detected, cause a corresponding message to be decoded in one of said plurality of demodulators.

6. The gateway device of claim 5, wherein the preamble search engine is arranged to detect sequences of a predetermined number of base chirps.

7. The gateway device of claim 5, further comprising a packet arbiter unit, operatively arranged for assigning messages corresponding to said detected preambles to one demodulator, based on a set of predetermined rules.

8. The gateway device of claim 1, further comprising at least one modulation unit for encoding a digital message into a modulated signal in which the digital information is encoded as transmitted chirp signals.

9. The gateway device of claim 8, wherein each transmitted chirp being limited in time between an initial instant, at which the signal has an initial instantaneous frequency and an initial phase; and a final instant at which the signal has a final instantaneous frequency and a final phase, the phase of the signal being essentially continuous.

10. The gateway device of claim 1, further comprising a Frequency Shift Keying (FSK) or Gaussian Frequency-Shift-Keying (GFSK) modulator.

11. The gateway device of claim 1, wherein the chirp signals being modulated in such a way that signals having different bitrates are orthogonal.

12. A gateway device having a processor for processing a plurality signals carrying a digital information modulated in the form of chirp signals, the chirp signals being either base chirps, for which the frequency changes from an initial instant to a final instant according to a predetermined base chirp function or modulated chirps, whose instantaneous frequencies vary according to one of a plurality of a functions that differ from said base chirp function, the gateway device further comprising a plurality of demodulators, arranged for simultaneously demodulating a plurality of signals having different bitrates, wherein said chirp signals include preamble parts, and the gateway device further comprising a preamble search engine, the preamble search engine being operatively arranged to scan the signals generated from frequency converters, identify said preamble parts for all data rates and, when a preamble is detected, cause a corresponding message to be decoded in one of said plurality of demodulators, the gateway device further comprising a packet arbiter unit, operatively arranged for assigning messages corresponding to said detected preambles to one demodulator of the plurality of demodulators.

13. The gateway device of claim 12, wherein the packet arbiter being arranged for assigning the messages corresponding to said detected preambles to one demodulator of the plurality of demodulators based on a set of predetermined rules.

* * * * *